UNITED STATES PATENT OFFICE.

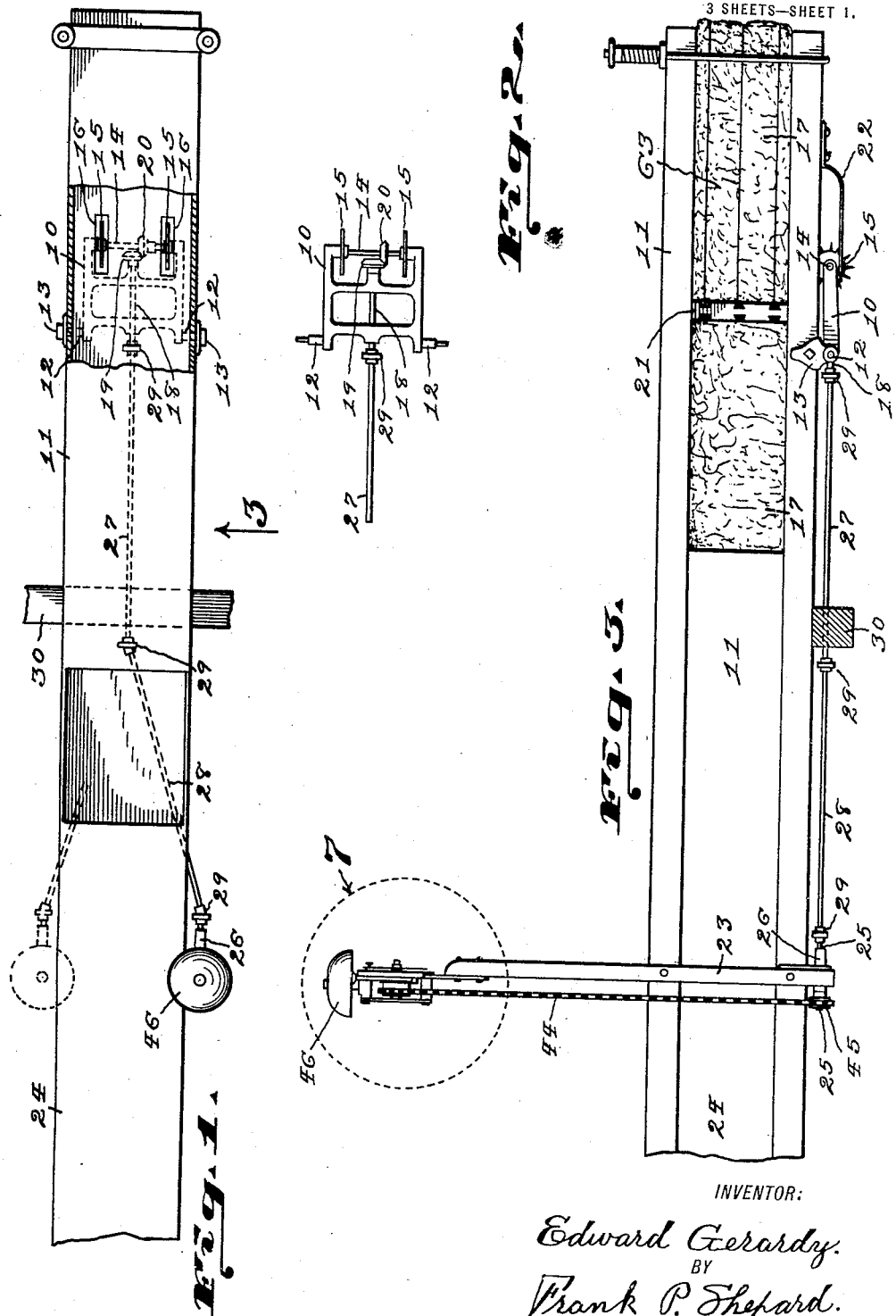

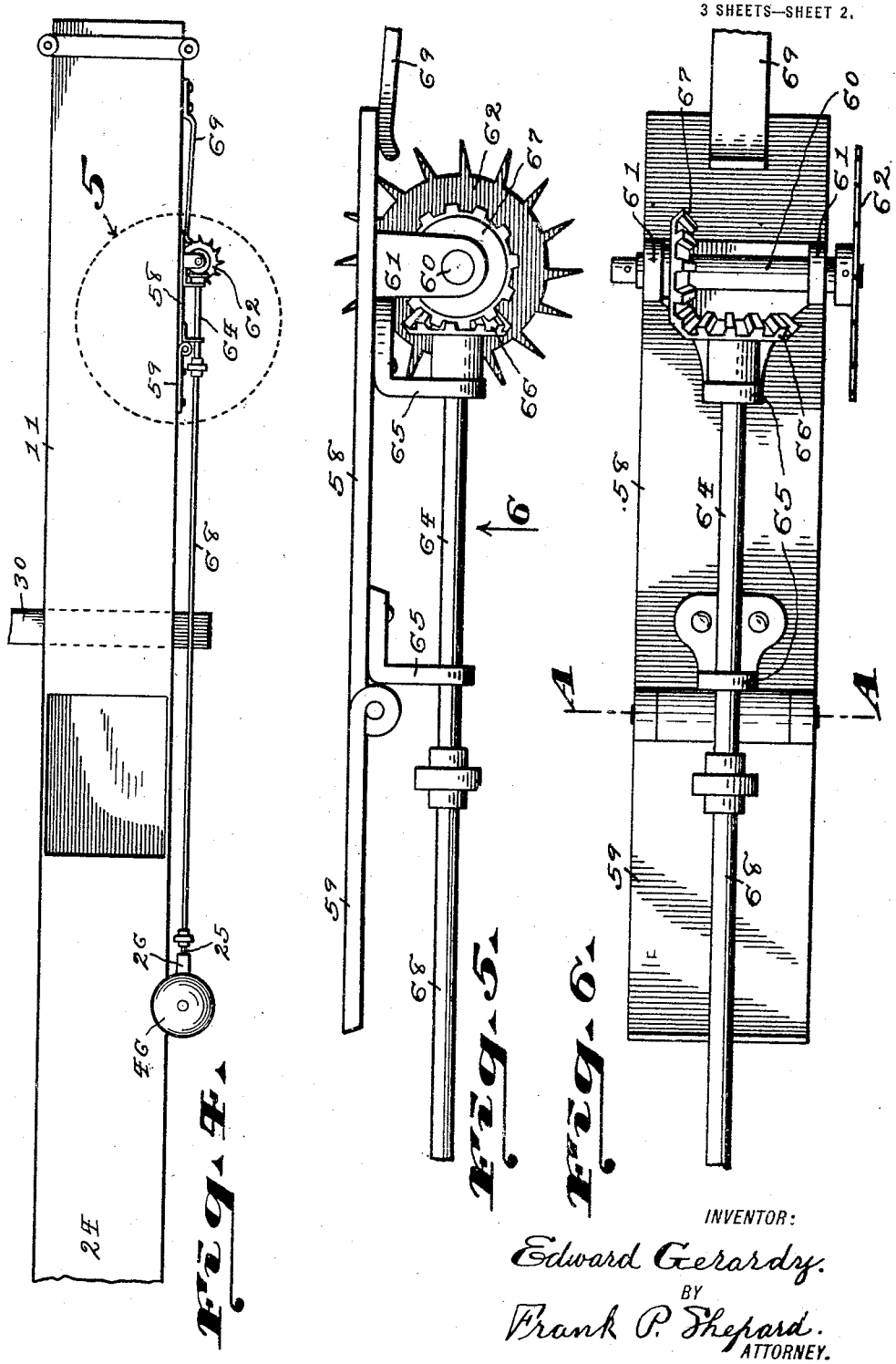

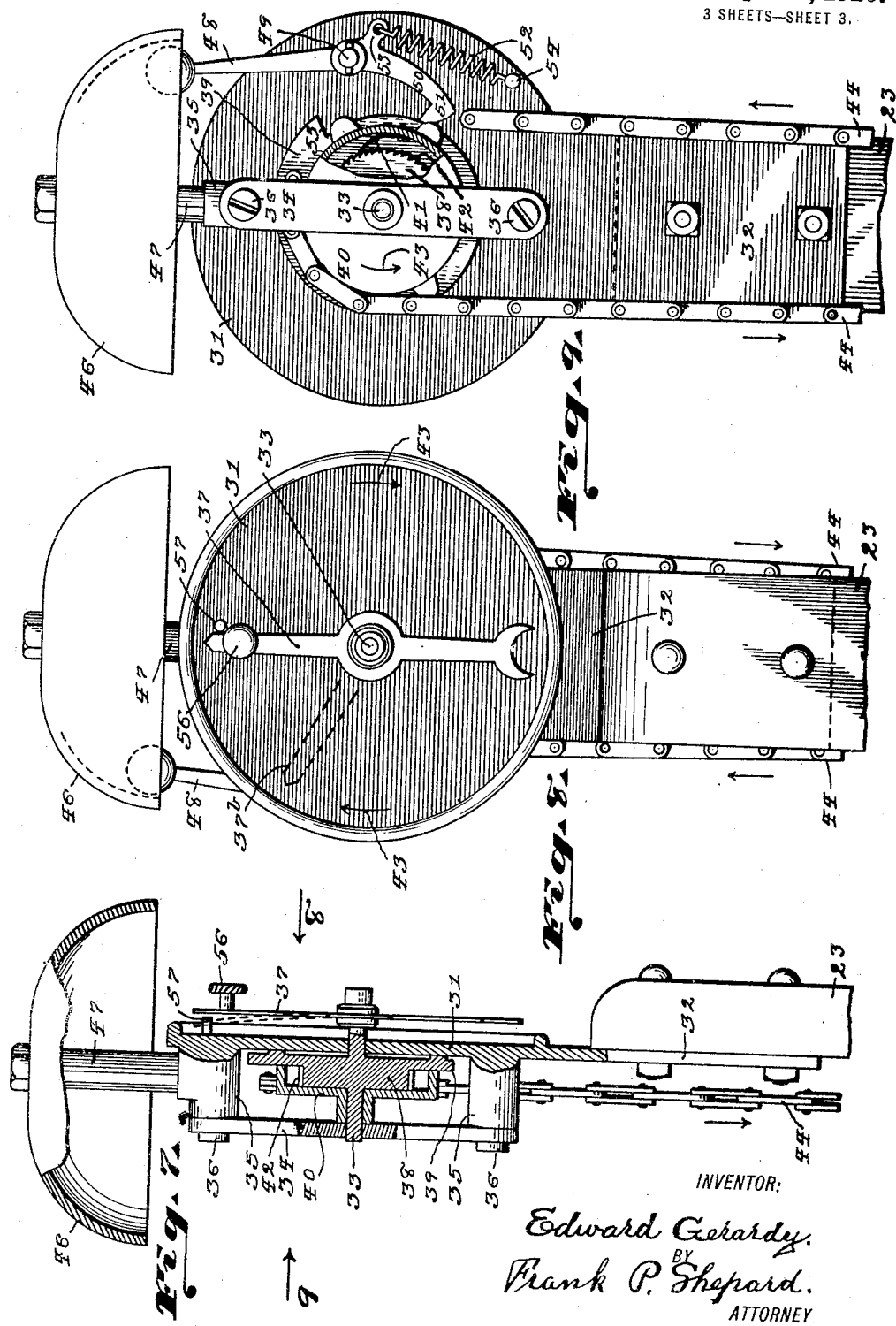

EDWARD GERARDY, OF CHANDLER, OKLAHOMA.

INDICATOR FOR HAY-PRESSES.

1,337,553.
Specification of Letters Patent.
Patented Apr. 20, 1920.

Application filed May 14, 1917. Serial No. 168,398.

*To all whom it may concern:*

Be it known that I, EDWARD GERARDY, a citizen of the United States, residing at Chandler, in the county of Lincoln and State of Oklahoma, have invented certain new and useful Improvements in Indicators for Hay-Presses, of which the following is a specification, reference being had to the accompanying drawings.

The invention pertains to improvements in hay presses, an object being to provide means by which the person feeding hay into a press may know when a bale of proper length has been formed and when to place into the press a division-block.

Other objects and advantages of the invention will be set forth in the ensuing description.

The drawings show one embodiment of the invention in practical form.

Figure 1 is a plan view of a hay press with the improvements installed thereon.

Fig. 2 is a similar view, showing in full lines certain parts which are indicated in dotted lines in Fig. 1.

Fig. 3 is an elevation view taken in the direction of the arrow 3 of Fig. 1.

Fig. 4 is a plan view showing an optional construction and arrangement of parts.

Fig. 5 is an enlarged reproduction of that part of Fig. 4 included within the circular dotted line 5, but with the press-box omitted.

Fig. 6 is an elevation view of the parts shown in Fig. 5, taken in the directon of the arrow 6.

Fig. 7 is a reproduction, on the same scale as Figs. 5 and 6, of that portion of Fig. 3 included within the dotted circular line 7, but with many of the parts shown in section.

Fig. 8 is an elevation view of the parts shown in Fig. 7, taken in the direction of the arrow 8.

Fig. 9 is an elevation view of the parts shown in Fig. 7, taken in the direction of the arrow 9.

Like characters of reference designate like parts in all the figures, with the exception that some of the characters are omitted on parts within the circular dotted lines 5 and 7.

The improvements include a substantially rectangular cast frame 10, best shown in Fig. 2, which is disposed in a substantially horizontally plane under the press-box 11 and has one of its edges pivoted to the press-box on a horizontal axis-line at right angles to the line of length of the press-box.

In pivoting this frame 10, its two side pintles 12 are supported in bearings 13 which are bolted to the sides of the press-box 11.

The free edge of this frame 10 has journaled through it a shaft 14, parallel with the line of axis of the pintles 12, and this shaft carries two toothed wheels 15 which project upward through slots 16 in the bottom of the press-box 11 in position to engage a passing bale 17 of hay and be revolved by said bale.

A second shaft 18, parallel with the line of length of the press-box 11, is journaled in the frame 10, this shaft being provided with a tight gear-pinion 19 which takes motion from a similar gear-pinion 20 mounted tightly on the shaft 14.

In order that a division-block 21, which is used between bales 17 in the press-box 11, may pass the toothed wheels 15, the free edge of the frame 10 may yield and swing downward while said division-block passes; and these toothed wheels are yieldably held up to their work by leaf springs 22 which are riveted to the under side of the press-box and bear upward on said frame 10.

In further arrangement, a supporting standard 23 is bolted to the side of the press-box 11 at its initial end 24 and at the upper end of said standard it is provided with visible and audible means for indicating the completion of a bale 17.

At the lower end of this standard 23, a shaft 25 is journaled in a bearing 26, and this shaft 25 is driven by the shaft 18 of the frame 10 through an operative connection comprising two sections 27 and 28 of shafting and three universal joints 29.

The end of the section 27 of shafting is journaled in the wooden axle 30 which is commonly found under press-boxes 11.

The indicating means at the upper end of the standard 23 includes a dial-plate 31 whose depending extension 32 is bolted to the standard as best shown in Figs. 7 to 9.

A shaft 33 has its front end journaled in the center of the dial-plate 31 and its rear end in a supporting bar 34 which is secured to two rearwardly-extending studs 35 of the dial-plate by screws 36.

The front end of this shaft 33 carries an indicator arm 37 adapted to be revolved around the dial-plate 31 as a bale 17 is forced through the press-box 11; and said shaft 33 is further provided at the rear of the dial-plate with a ratchet-wheel 38 and a cam-wheel 39 which may be integral with said shaft as shown.

The ratchet-wheel 38 is housed by a sprocket-wheel 40 which is revoluble on the shaft 33 and which has a pawl 41 adapted to engage the teeth 42 of the ratchet-wheel to drive the latter forward in the direction of the arrows 43.

This sprocket-wheel 40 is driven, through a link belt 44, by a smaller sprocket-wheel 45 which is carried by the shaft 25 at the lower end of the standard 23.

With the parts arranged as described, it will be seen that when a bale 17 is moving forward in the press-box 11 the toothed wheels 15 are revolved, and these toothed wheels 15, through the operative connections described, drive the indicator arm 37 around the dial-plate 31.

The operative connections may be so arranged that the passing of a bale 17 of predetermined length revolves the indicator arm 37 around just one complete revolution from the "zero" position shown in Fig. 8, thus making it convenient for the person feeding hay into the press-box to note the indicator arm and insert a division-block 21 into the press-box 11 at the proper time.

As an audible warning, a bell 46 is mounted on a small standard 47 which projects upward from the dial-plate 31, and a hammer 48 is pivoted on a stud 49 on the back of the dial-plate and adapted to ring said bell.

An arm portion 50 extends downward from the pivotal portion of the hammer 48, and the lower or hooked end 51 of this arm bears slidably against the periphery of the cam-wheel 39 in obedience to a tension spring 52 which is hitched to a small arm portion 53 of the hammer and to a stud 54 on the rear of the dial-plate 31.

Just in advance of the completion of a bale 17, for example when the indicator arm 37 is at the "ten-o'clock" point indicated by the dotted lines 37ᵇ in Fig. 8, the hooked lower end 51 of the arm 50 drops off the off-set 55 of the cam-wheel 39 and allows the spring 52 to produce the ringing stroke of the hammer; and the ring of the bell 46 calls attention to the approach of the indicator arm to zero position.

Should the feeder fail, from any cause, to note the zero position of the indicator arm 37 and let it pass to a portion of a successive revolution, he may re-set the indicator arm to zero by taking hold of its finger-button 56 and swinging it around in advance direction.

The tooth-and-pawl connection between the ratchet-wheel 38 and the sprocket-wheel 40, best shown in Fig. 9, allows the forward re-setting movement of the indicator arm 37; and without close observation the feeder may stop the indicator arm exactly at zero position by temporarily springing it in toward the dial-plate 31 and catching it on a stop-pin 57 which is set in the dial-plate.

Since it might be inconvenient or impractical in some instances to pivot the frame 10 under the press-box 11, the optional construction and arrangement shown in Figs. 4 to 6 may be employed.

In this arrangement, the inventor pivots a strap-metal plate 58 to a bearing 59 which is riveted to the side of the upper portion of the press-box 11, the axis-line A—A of this pivotal connection being vertical.

A short shaft 60 is journaled vertically in the free or forward end of the plate 58 in bearings 61 and carries a toothed wheel 62 which is adapted to engage the bale 17 through the large opening 63 left in the side of the press-box 11 for applying bale ties.

A second shaft 64 is journaled horizontally on the plate 58 in bearings 65 thereon, this shaft having a gear-pinion 66 which receives motion from a similar gear-pinion 67 on the shaft 60.

It will be seen that by the operative connections described the motion imparted to the toothed wheel 62 by the passing bale 17 revolves the shaft 64, and that by journaling the shaft 25 aforesaid up at a higher point on the standard 23 a shaft 68 may be employed as an operative connection between the two shafts 64 and 25.

The plate 58 and its toothed wheel 62 are held yieldably inward toward the press-box 11 by a leaf spring 69 which is riveted to the press-box.

Having thus described the invention, I claim:—

1. In a hay press, the combination with a press box having an opening in one side thereof, of a frame movable toward and away from the box, a bale engaging wheel carried by the frame and adapted to be moved through the opening of the box into engagement with a bale so as to be rotated by the bale as the latter is moved through the box, a shaft journaled upon the box and operatively connected to the wheel on the movable frame, and indicating means actuated by the shaft.

2. In a hay press, the combination with a press having an opening in one side thereof, of a swinging frame pivotally mounted upon the box, a bale engaging wheel journaled upon the swinging frame and movable therewith toward and away from the box, yielding means engaging the frame to swing the same toward the box and cause the wheel to project through the opening of the box into engagement with a bale passing through the same, a shaft journaled upon the box and connected to the wheel, a universal joint interposed in the length of the joint to provide for the swinging movement of the frame, and indicating means operatively connected to the shaft for actuation thereby.

Witness my hand this 7th day of May, 1917.

EDWARD GERARDY.